United States Patent [19]
Briggs et al.

[11] 3,828,527
[45] Aug. 13, 1974

[54] LEAK DETECTION APPARATUS AND INLET INTERFACE

[75] Inventors: Walton E. Briggs, Lynnfield; Joseph C. Maliakal, Millis, both of Mass.

[73] Assignee: Varian Associates, Palo Alto, Calif.

[22] Filed: Sept. 28, 1972

[21] Appl. No.: 293,206

[52] U.S. Cl................. 55/158, 210/321, 210/450
[51] Int. Cl............................................. B01d 31/00
[58] Field of Search............ 250/41.9 S; 55/16, 158; 210/433, 450, 449, 446, 447, 460, 321, 500

[56] References Cited
UNITED STATES PATENTS

| | | | |
|---|---|---|---|
| 2,879,207 | 3/1959 | Poitras............................ | 210/446 X |
| 3,211,996 | 10/1965 | Fox................................. | 250/41.9 S |
| 3,401,802 | 9/1968 | Fann................................ | 210/446 |
| 3,455,092 | 7/1969 | Llewellyn........................ | 210/321 X |
| 3,614,856 | 10/1971 | Sanz et al. ....................... | 55/158 X |
| 3,697,748 | 10/1972 | Cohen ............................. | 250/41.9 S |

*Primary Examiner*—Frank A. Spear, Jr.
*Attorney, Agent, or Firm*—Stanley Z. Cole; Leon F. Herbert; John J. Morrissey

[57] ABSTRACT

A leak detection apparatus having a mass spectrometer tuned to detect helium has an interface with atmosphere in the form of a portable probe containing a gas inlet membrane which is operable without a heater to permit the passage of helium in sufficient quantity for sensitive detection of leaks.

4 Claims, 2 Drawing Figures

LEAK DETECTION APPARATUS AND INLET INTERFACE

BACKGROUND OF THE INVENTION

Mass spectrometer leak detectors are well known. The type of interface currently used between such detectors and atmosphere consists of a probe having a small orifice having an admittance of about $10^{-3}$ cubic centimeters per second between atmosphere and the vacuum in the detector. This low admittance is required to prevent admitting a quantity of gas which would damage the mass spectrometer. In operation the probe is moved along the wall of a chamber containing a test gas such as helium. When a leak is encountered, the test gas will pass through the orifice and be detected by the mass spectrometer which is tuned for the particular test gas.

The problem with such devices is that the small orifice easily becomes clogged with airborne dust or moisture with the result that even if a leak is encountered by the probe the test gas will not pass through the clogged orifice in sufficient quantity to indicate the correct magnitude of the leak or the gas will not pass sufficiently to indicate any leak at all. In addition, the orifice type probe is not selective in admittance of different types of gases so that for a given gas flow the amount of test gas reaching the detector is much less than if the probe admitted the test gas more easily than the background gases in the atmosphere.

Another approach to leak detection has been to use a solid glass diaphragm through which gas passes to a conventional ionization pressure gauge. Although such diaphragms have different permeation rates for different gases they involve the use of a heater. The need for a heater adds to the complication and expense of fabricating a probe which will contain a heater and be able to withstand the high temperature operation. Examples of such glass diaphragms are found in U.S. Pat. Nos. 3,100,868 issued Aug. 13, 1963 and 3,280,619 issued Oct. 25, 1966.

SUMMARY OF THE INVENTION

The object of the present invention is to provide a leak detection system having a simple, rugged inlet interface construction.

A more specific object is to provide the inlet interface in a form which is not subject to the clogging problems of the orifice type, which is extremely preferential in the admittance of helium in relation to other gases in the atmosphere and which provides relatively large flow of test gas at room temperature.

In the preferred embodiment the leak detection system comprises a mass spectrometer leak detection apparatus having a gas inlet interface in the form of a membrane which is highly selective to helium and admits a sufficiently large quantity of helium at room temperature to provide sensitive leak detection over a range of leak sizes. The preferred material for the interface membrane is polytetrafluoroethylene.

DESCRIPTION OF PREFERRED EMBODIMENTS

Figure 1:
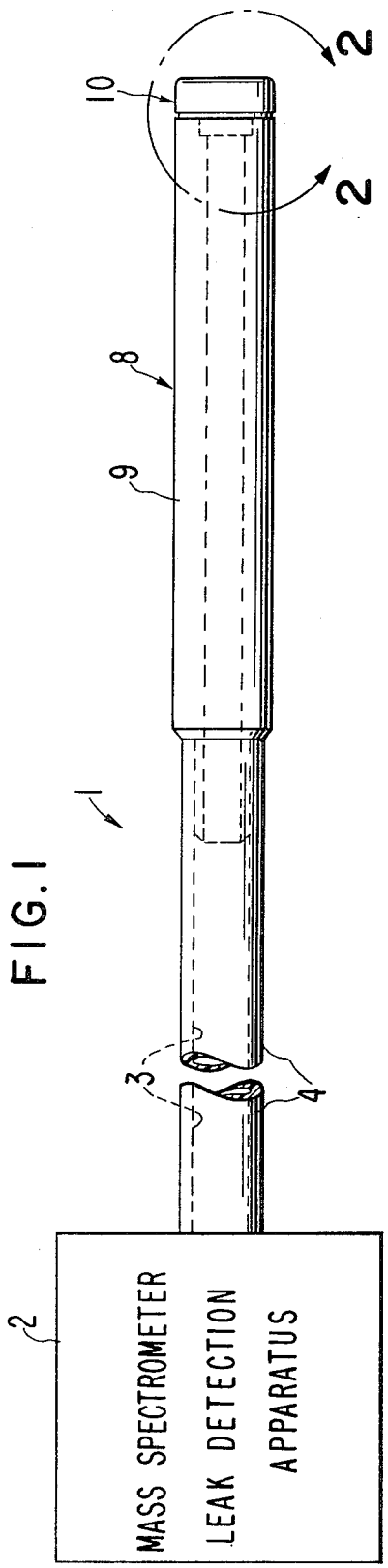
FIG. 1 is a partly schematic view of a mass spectrometer leak detection system in which the interface membrane is in a portable probe.

The leak detection system 1 comprises a conventional mass spectrometer leak detection apparatus 2. As is well known in the art, such conventional apparatus comprises a mass spectrometer tube and a high vacuum pumping system for creating and maintaining a high vacuum in the mass spectrometer. The leaking gas which is being detected flows into the mass spectrometer by virtue of the low pressure therein relative to the ambient atmosphere. In the instant invention the mass spectrometer is tuned to detect helium as a trace gas. An appropriate mass spectrometer is disclosed in detail in U.S. Pat. No. 3,277,295 issued Oct. 4, 1966.

The mass spectrometer would be damaged by an excess of gas, and therefore an interface is required between room atmosphere and the inlet passage 3 in an inlet tubing 4 which constitutes the inlet to the mass spectrometer in the detection apparatus 2. According to the invention, the interface is in the form of a membrane 7 shown in FIG. 2.

In the embodiment shown in the drawings, the interface membrane 7 is located in a portable probe 8. The probe comprises a tubular metal body 9 by which the probe is held by an operator and the tubing 4 is flexible to provide mobility. The body 9 receives a probe head 10 carrying the membrane 7. A vacuum seal between body 9 and head 10 is provided by a conventional vacuum seal O-ring 11. Since membrane 7 is not self-supporting under the pressure differential caused by high vacuum in passage 3 and atmosphere on the right of the membrane, a perforated supporting disc 14 is provided to prevent rupture of the membrane. Disc 14 is seated in an annular recess 15 in the end of head 10. Disc 14 is of sufficient strength to prevent deformation under atmospheric pressure and is in the form of a wire screen or apertured plate with sufficient openings to form substantially no restriction to gas flow.

Figure 2:
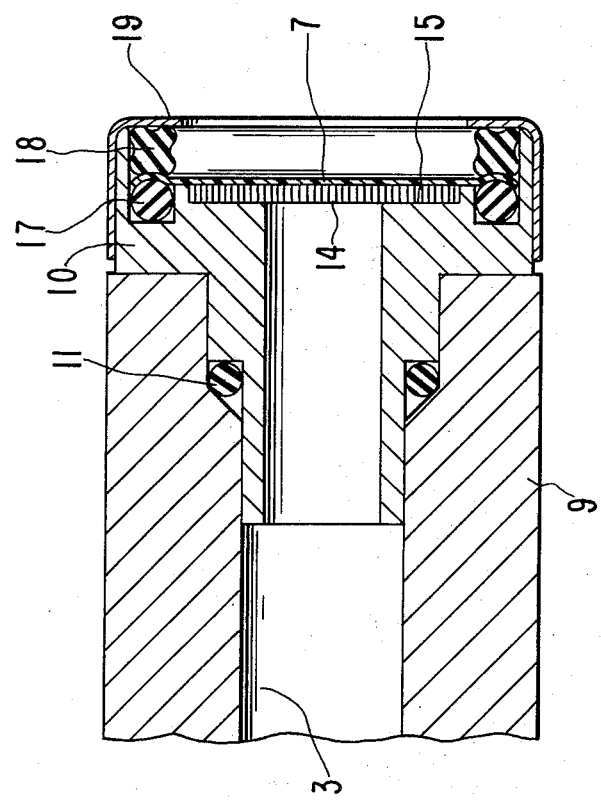
FIG. 2 is an enlarged cross-sectional view of the inlet end of the probe of FIG. 1 with the membrane and its support enlarged out of scale for clarity.

The membrane 7 is placed over a conventional vacuum seal O-ring 17. A conventional quad ring 18 is placed over the membrane. The rings 17 and 18 are held in place by a metal retaining cap 19. Cap 19 has a press fit around head 10 and when forced into position as shown in FIG. 2 the cap holds the membrane 7 in properly sealed position between rings 17 and 18.

In operation, to detect a leak through the wall of a structure (not shown), helium is provided on one side of the wall and probe 8 is moved along the other side of the wall. The helium may be pure or mixed with a less expensive gas such as air. If the structure wall has a leak, the helium will pass through the leak and through diaphragm 7 to the mass spectrometer in apparatus 2 to signal the leak.

Referring in more detail to membrane 2, it has been determined that the preferred material is polytetrafluoroethylene, available under the name PTFE Teflon from Chemplast Co. in New Jersey. In one very practical embodiment, the gas-admitting area is 2 square centimeters and the thickness is 2 mils. With such an interface the helium flow rate is higher than with an orifice interface, assuming the same total flow rate through both. As a result, the mass spectrometer can operate at a lower pressure while still being exposed to the same flow of the helium test gas. The lower the pressure at which the mass spectrometer can be operated and still see a given partial pressure of helium, the better. If an orifice type interface were made small enough to have the same low total gas flow rate as the stated membrane size, the orifice would be particularly subject to clogging and even in unclogged condition would admit less helium to the mass spectrometer.

What is claimed is:

1. A helium gas detection probe comprising a tubular member forming an inlet passage, a perforated supporting disk seated in said tubular member over the end of said passage, a solid one-piece polytetrafluoroethylene membrane positioned over the outside of said supporting disk, said membrane having an annular sealing portion extending beyond the periphery of said disk, the end of said tubular member adjacent said disk being recessed under said annular sealing portion of the membrane, a first sealing ring positioned in said recess inwardly of said annular portion of the membrane, a second sealing ring positioned outwardly of said annular sealing portion of the membrane, said tubular member having a wall portion confining said sealing rings against radially outward movement, and a cap ring having a side wall press-fitted over said tubular member and an inwardly projecting rim engaging said second sealing ring.

2. A leak detection probe as in claim 1 in which the gas inlet area of said membrane is substantially 2 centimeters square and the thickness of the membrane is substantially 2 mils.

3. A leak detection probe as claimed in claim 1 in which one of said sealing rings is an O-ring and the other is a quad ring.

4. The helium gas detection probe as claimed in claim 1 wherein said first sealing ring is an O-ring and said second sealing ring is a quad ring, said sealing rings being positioned on opposite sides of said annular sealing portion of the membrane such that press-fitting of said cap ring over said tubular member causes compression of said sealing rings against said annular sealing portion of the membrane whereby the side of said annular sealing portion in contact with said O-ring is caused to acquire a concave contour with respect to said O-ring and the side of said annular sealing portion in contact with said quad ring is caused to acquire a convex contour with respect to said quad ring.

* * * * *